(12) United States Patent
Hsu

(10) Patent No.: US 9,310,850 B2
(45) Date of Patent: Apr. 12, 2016

(54) SYNCHRONOUS MOVEMENT DEVICE APPLIED TO DUAL-SHAFT SYSTEM

(71) Applicant: FIRST DOME CORPORATION, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 17 days.

(21) Appl. No.: 14/524,141

(22) Filed: Oct. 27, 2014

(65) Prior Publication Data
US 2015/0040704 A1 Feb. 12, 2015

Related U.S. Application Data

(63) Continuation-in-part of application No. 13/914,768, filed on Jun. 11, 2013, now abandoned.

(51) Int. Cl.
| | |
|---|---|
| *G06F 1/16* | (2006.01) |
| *E05D 3/12* | (2006.01) |
| *H04M 1/02* | (2006.01) |
| *F16H 25/18* | (2006.01) |

(52) U.S. Cl.
CPC ............... *G06F 1/1681* (2013.01); *E05D 3/12* (2013.01); *H04M 1/0216* (2013.01); *E05D 3/122* (2013.01); *E05Y 2900/606* (2013.01); *F16H 25/186* (2013.01); *Y10T 16/5387* (2015.01); *Y10T 16/547* (2015.01); *Y10T 16/54038* (2015.01); *Y10T 16/540255* (2015.01); *Y10T 74/1836* (2015.01); *Y10T 74/1888* (2015.01)

(58) Field of Classification Search
CPC ........... E05F 1/043; E05F 1/061; E05F 1/063; E05F 1/065; E05F 1/066; E05D 3/18; E05D 3/06; E05D 3/12; G06F 1/1681; G06F 1/1618; Y10T 16/547; Y10T 16/5474; Y10T 16/5478; Y10T 16/546; Y10T 16/53864; Y10T 16/5398; Y10T 16/53984; Y10T 16/53987; Y10T 16/53988; Y10T 16/544; Y10T 16/5443

See application file for complete search history.

(56) References Cited

U.S. PATENT DOCUMENTS

| | | | | |
|---|---|---|---|---|
| 4,200,957 A | * | 5/1980 | Hsu ......................... | E05F 1/066 16/314 |
| 4,242,773 A | * | 1/1981 | Beigh ...................... | E05D 3/12 16/371 |
| 5,493,760 A | * | 2/1996 | Takimoto ................. | E05D 3/12 16/366 |
| 5,666,694 A | * | 9/1997 | Slow ....................... | G06F 1/1618 16/308 |
| 7,414,834 B2 | * | 8/2008 | Ukonaho ................. | H04M 1/022 16/354 |
| 7,512,426 B2 | * | 3/2009 | Maatta .................... | H04M 1/0218 16/354 |
| 7,667,959 B2 | * | 2/2010 | Pelkonen ................. | G06F 1/1616 248/923 |
| 7,738,930 B2 | * | 6/2010 | Petrella .................... | H04M 1/022 16/221 |
| 7,765,644 B2 | * | 8/2010 | Ueyama .................. | G06F 1/1616 16/354 |
| 7,900,323 B2 | * | 3/2011 | Lin .......................... | F21S 6/003 16/254 |
| 8,474,101 B2 | * | 7/2013 | Wang ....................... | G06F 1/1681 16/354 |

(Continued)

*Primary Examiner* — Jeffrey O Brien
(74) *Attorney, Agent, or Firm* — Rosenberg, Klein & Lee

(57) ABSTRACT

A synchronous movement device applied to dual-shaft system includes a first shaft and a second shaft, which are assembled with each other and synchronously rotatable. The synchronous movement device further includes a driver disposed on the first shaft and a reactor disposed on the second shaft and a link unit connected between the driver and the reactor. When the first shaft drives the driver to rotate, the driver pushes the link unit to move along the first and second shafts to forcedly push the reactor to rotate in a direction reverse to the moving direction of the driver. Accordingly, the first and second shafts are synchronously rotated.

14 Claims, 6 Drawing Sheets

(56) References Cited

U.S. PATENT DOCUMENTS

| | | | | |
|---|---|---|---|---|
| 8,615,848 B2 * | 12/2013 | Mitsui | H04M 1/022 | 16/354 |
| 8,904,601 B2 * | 12/2014 | Hsu | H04M 1/0216 | 16/366 |
| 2006/0236505 A1 * | 10/2006 | Maatta | G06F 1/1681 | 16/366 |
| 2006/0238970 A1 * | 10/2006 | Ukonaho | H04M 1/022 | 361/679.01 |
| 2008/0307608 A1 * | 12/2008 | Goto | G06F 1/1618 | 16/366 |
| 2009/0000062 A1 * | 1/2009 | Yamanami | G06F 1/1616 | 16/366 |
| 2009/0013500 A1 * | 1/2009 | Ueyama | G06F 1/1616 | 16/354 |
| 2012/0096678 A1 * | 4/2012 | Zhang | G06F 1/1681 | 16/302 |
| 2013/0111704 A1 * | 5/2013 | Mitsui | H04M 1/022 | 16/250 |
| 2014/0251040 A1 * | 9/2014 | Hsu | H04M 1/0216 | 74/63 |

* cited by examiner

SYNCHRONOUS MOVEMENT DEVICE APPLIED TO DUAL-SHAFT SYSTEM

CROSS-REFERENCE TO RELATED APPLICATION

This application is a continuation-in-part application of U.S. patent application Ser. No. 13/914,768, filed 11 Jun. 2013, entitled "synchronous movement device applied to dual-shaft system", now pending.

BACKGROUND OF THE INVENTION

1. Field of the Invention

The present invention relates generally to a synchronous movement device applied to dual-shaft system including a first shaft and a second shaft. The synchronous movement device includes a driver disposed on the first shaft and a reactor disposed on the second shaft and a link unit connected between the driver and the reactor. In operation, the driver, the link unit and the reactor serve to transmit force to make the first and second shafts synchronously rotate.

2. Description of the Related Art

There are various electronic apparatuses provided with covers or display screens or viewers, such as mobile phones, notebooks, PDA, digital imagers and electronic books. The covers or display screens or viewers are pivotally mounted on the electronic apparatuses via pivot pins or rotary shafts, whereby the covers or display screens or viewers can be freely rotated and opened/closed under external force.

In order to operate the display module (such as the screen) and/or the apparatus body module of the electronic apparatus in more operation modes and application ranges, a dual-shaft mechanism is provided between the display module and the apparatus body module, whereby the display module and/or the apparatus body module can be operated in different operation modes by different rotational angles.

In the above conventional pivot pin structures or rotary shaft structures, generally multiple gaskets with through holes and recessed/raised locating sections, multiple frictional plates and multiple cooperative springs are assembled on the rotary shaft. Two ends of the rotary shaft are respectively fixed by means of retainer rings or retainer members. The springs serve to store energy and release the energy to achieve the objects of rotating and locating the rotary shaft or pivot pin assembly. Basically, the above structures are relatively complicated and it is hard to assemble the structures. Moreover, after a period of operation, the recessed/raised locating sections of the gaskets or frictional plates are likely to wear. This will affect the locating effect.

There is also a conventional mechanism composed of rollers and drive wires (or transmission belts) for transmitting force to the rotary shaft so as to rotate the rotary shaft. As known by those who are skilled in this field, during the operation process of the wires or the transmission belts, delay of kinetic energy transmission will take place. This is because there is a gap between the wires (or transmission belts) and the rollers and the wires (or transmission belts) will slip or untruly operate. Also, the wires (or transmission belts) are made of elastic material and the fixing structure for assembling the wires (or transmission belts) with the rollers is not ideal. As a result, in force transmission, the load on the wires or the pulling force applied to the wires will increase. In this case, the transmission and shift effect of the wires will be deteriorated and the wires may detach from the rollers. Especially, after a period of use, the force of the wires or transmission belts, which is preset in the assembling process will decrease due to elastic failure. Under such circumstance, the synchronous movement effect of the transmission mechanism will be deteriorated.

In some cases, the wires or transmission belts have serious elastic fatigue and often detach from the rollers during the movement of the slide cover module. Under such circumstance, the rotary shaft device will lose its synchronous displacement effect.

There is another problem existing in the application and manufacturing of the wires or transmission belts. That is, during the assembling process of the wires or transmission belts, the wires or transmission belts need to be tensioned. This will make it more difficult to control the quality of wiring and assembling. Therefore, the ratio of good products can be hardly promoted and the assembling time can be hardly shortened. As a result, the manufacturing cost is increased.

In order to improve the above problems, a conventional dual-shaft synchronous movement device has been developed. Such dual-shaft synchronous movement device employs multiple gears for transmitting force. However, as known by those who are skilled in this field, with the transmission gears, the gap between the shafts of the dual-shaft synchronous movement device can be hardly minified. Therefore, the entire transmission unit or structure will occupy a considerably large space. Especially, when the transmission unit is applied to a notebook or a miniaturized electronic device, the electronic device can hardly meet the requirement for lightweight and slimmed design. This is not what we expect.

Various conventional dual-shaft mechanisms are applied to mobile phones or electronic apparatuses. For example, U.S. Pat. No. 7,512,426 B2 discloses a dual-shaft mechanism including a first shaft and a second shaft. The first and second shafts are formed with threaded protrusion sections assembled with inner threads of a block, whereby the block is movable along the first and second shafts.

It should be noted that U.S. Pat. No. 7,512,426 B2 has two problems to be solved or improved as follows:

1. It is necessary to drill the entirely closed block to form inner threads in adaptation to the threaded protrusion sections of the first and second shafts. Therefore, the manufacturing and assembling processes are relatively complicated. Especially, when applied to a sophisticated electronic apparatus such as a mobile phone or the like, the manufacturing and assembling time is prolonged and the difficulty in manufacturing and assembling the dual-shaft mechanism is increased.

2. The threaded protrusion sections of the first and second shafts are assembled with the inner threads of the block. In order to prevent the block from sliding and avoid delay of power transmission in operation, a higher cooperation precision is required. This makes it more difficult and troublesome to manufacture and assemble the dual-shaft mechanism.

Also, there are some conventional mono-shaft hinge structures applied to a door or furniture system. For example, U.S. Pat. No. 4,200,957 discloses a mono-shaft hinge structure including a left flap and a right flap. A sleeve and a shaft are passed through the left flap. The shaft is formed with a hole in which a pin member is inserted to fit with a roller. The right flap is provided with a socket formed with an inclined slot. After the sleeve and the shaft of the left flap are assembled with the socket of the right flap, the pin member fitted on the roller is relatively movable within the inclined slot.

It should be noted that U.S. Pat. No. 4,200,957 is inapplicable to electronic apparatus due to two technical key points as follows:

1. The structure of U.S. Pat. No. 4,200,957 is specifically designed for application to a door. Therefore, it is inapplicable to a mobile phone or an electronic apparatus to synchronously relatively 180-degree (totally 360-degree) rotate the display screen and the apparatus body.
2. According to the structural characteristic and the connection relationship between the components of U.S. Pat. No. 4,200,957, as a whole, it is impossible to simply and directly modify the structure of U.S. Pat. No. 4,200,957 into a dual-shaft system. This is because even if the socket is replaced with two cylindrical structures for mounting two rotary shafts, the power still cannot be transmitted between the two rotary shafts to achieve the object of synchronous movement of the two rotary shafts.

That is, it is impossible to combine U.S. Pat. No. 7,512,426 B2 with U.S. Pat. No. 4,200,957. The structure of U.S. Pat. No. 4,200,957 is a rough mono-shaft system and hard to modify to be mounted on a sophisticated electronic apparatus. The specification of U.S. Pat. No. 4,200,957 fails to specifically recite or suggest how to modify the mono-shaft system into dual-shaft system for achieving synchronous movement of the two rotary shafts.

The conventional rotary shaft structures and the relevant connection components thereof have some shortcomings in use and structural design that need to be overcome. It is therefore tried by the applicant to provide a dual-shaft synchronous movement device and an assembling method thereof to eliminate the shortcomings existing in the conventional rotary shaft structure so as to widen the application range and facilitate the assembling process of the rotary shaft structure.

The synchronous movement device applied to the dual-shaft system of the present invention has the following advantages:

1. The synchronous movement device of the present invention is mounted between the display module and the apparatus body module. When an operator 0°~180° rotates the display module, the apparatus body module is synchronously relatively 0°~180° rotated. Therefore, the total rotational angle of the display module and the apparatus body module is 360°. Accordingly, the operator can more quickly and conveniently operate the electronic apparatus in more operation modes (or application ranges). Also, the synchronous movement effect and operational stability of the synchronous movement device and the cooperative rotary shafts are enhanced.
2. The synchronous movement device or transmission mechanism of the present invention is free from any of the gaskets with through holes and recessed/raised locating sections and the frictional plates as well as the springs employed in the conventional rotary shaft structures. Therefore, the problems existing in the conventional technique that the structures are relatively complicated and it is hard to assemble the structures and the recessed/raised locating sections of the gaskets or frictional plates are likely to wear can be apparently improved.
3. The synchronous movement device of the present invention overcomes the problem of delay of kinetic energy transmission of the conventional wires or transmission belts. The synchronous movement device of the present invention also solves the problem of the conventional transmission mechanism that there is a gap between the wires and the rollers so that the wires will slip or untruly operate. The synchronous movement device of the present invention also solves the problem of the conventional transmission mechanism that the fixing structure for assembling the wires with the rollers is not ideal so that in force transmission, the load on the wires or the pulling force applied to the wires will increase to deteriorate the transmission effect.
4. The synchronous movement device or transmission mechanism of the present invention is free from any gear for transmitting force as in the conventional technique. Therefore, the gap between the shafts can be as minified as possible. Therefore, the space occupied by the entire transmission unit or structure is reduced. Accordingly, when the transmission unit is applied to an electronic device, the electronic device can meet the requirement for lightweight and slimmed design.
5. With respect to U.S. Pat. No. 7,512,426 B2, it is necessary to drill the entirely closed block to form inner threads in adaptation to the threaded protrusion sections of the first and second shafts. The processing process is complicated and the processing time is prolonged. The present invention is applicable to a sophisticated electronic apparatus such as a mobile phone or the like to solve the above problem. Moreover, the present invention solves the problems of sliding of the block and delay of power transmission. Especially, the present invention improves the problem of U.S. Pat. No. 7,512,426 B2 that a higher cooperation precision is required. Therefore, the present invention has simpler structure and is easy to manufacture and assemble.
6. With respect to U.S. Pat. No. 4,200,957, the structure of U.S. Pat. No. 4,200,957 is specifically designed for application to a door or furniture system. U.S. Pat. No. 4,200,957 fails to specifically teach how to modify the mono-shaft system into dual-shaft system for achieving power transmission effect. Moreover, the structure of U.S. Pat. No. 4,200,957 is inapplicable to a sophisticated electronic apparatus such as a mobile or the like to synchronously relatively 180-degree (totally 360-degree) rotate the display screen and the apparatus body. The present invention is redesigned to overcome the above problems.

SUMMARY OF THE INVENTION

It is therefore a primary object of the present invention to provide a synchronous movement device applied to dual-shaft system including a first shaft and a second shaft. The synchronous movement device includes a driver disposed on the first shaft and a reactor disposed on the second shaft and a link unit connected between the driver and the reactor. In operation, the driver, the link unit and the reactor serve to transmit force to make the first and second shafts synchronously rotate.

In the above synchronous movement device applied to dual-shaft system, the driver and the reactor have the form of a raised section. The driver and the reactor are respectively disposed on the first and second shafts. The link unit includes a first main body and a second main body movably assembled on the first and second shafts respectively. The first and second main bodies have the form of a geometrical case. Each of the first and second main bodies is formed with a cavity. The circumferences of the cavities of the first and second main bodies respectively range from 180 degrees to 360 degrees. Each of the first and second main bodies is formed with a split in the axial direction in parallel to the cavity. The angle of the split is smaller than 180 degrees, (and preferably ranges from 100 degrees to 145 degrees). Accordingly, the first and second shafts can rotate within the cavities without detaching from the first and second main bodies.

The first and second main bodies are respectively formed with guide grooves corresponding to the driver and the reactor for relatively movably receiving the driver and the reactor.

When the first shaft drives the driver to rotate, the driver received in the guide groove of the first main body pushes the link unit to move along the first and second shafts. At the same time, the inner wall of the guide groove of the second main body pushes the reactor to rotate in a direction reverse to the rotational direction of the driver. Accordingly, the second shaft is synchronously rotated in a direction reverse to the rotational direction of the first shaft.

It should be noted that the first and second main bodies are respectively formed with the splits to especially help in forming the guide grooves on the first and second main bodies.

The present invention can be best understood through the following description and accompanying drawings, wherein:

DETAILED DESCRIPTION OF THE PREFERRED EMBODIMENTS

Figure 1:
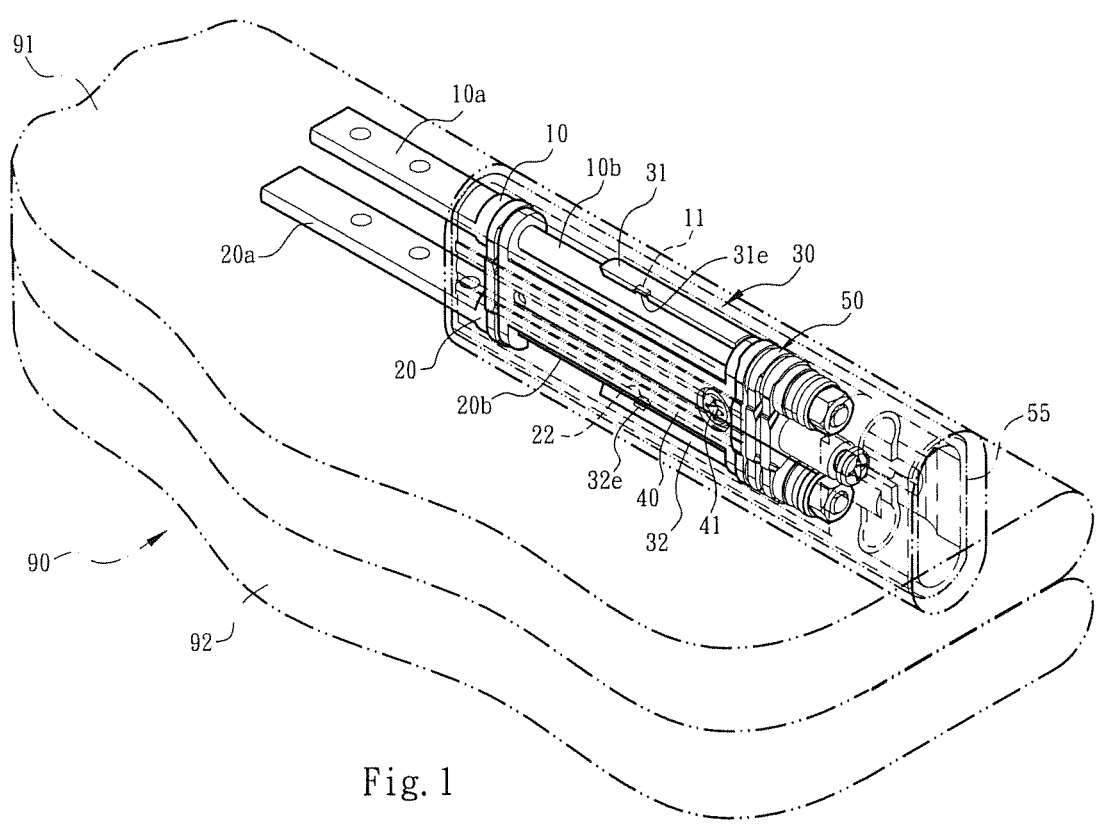
FIG. 1 is a perspective assembled view of the synchronous movement device of the present invention and the casing thereof, in which the phantom lines show that the display module is closed on the apparatus body module.
Figure 2:
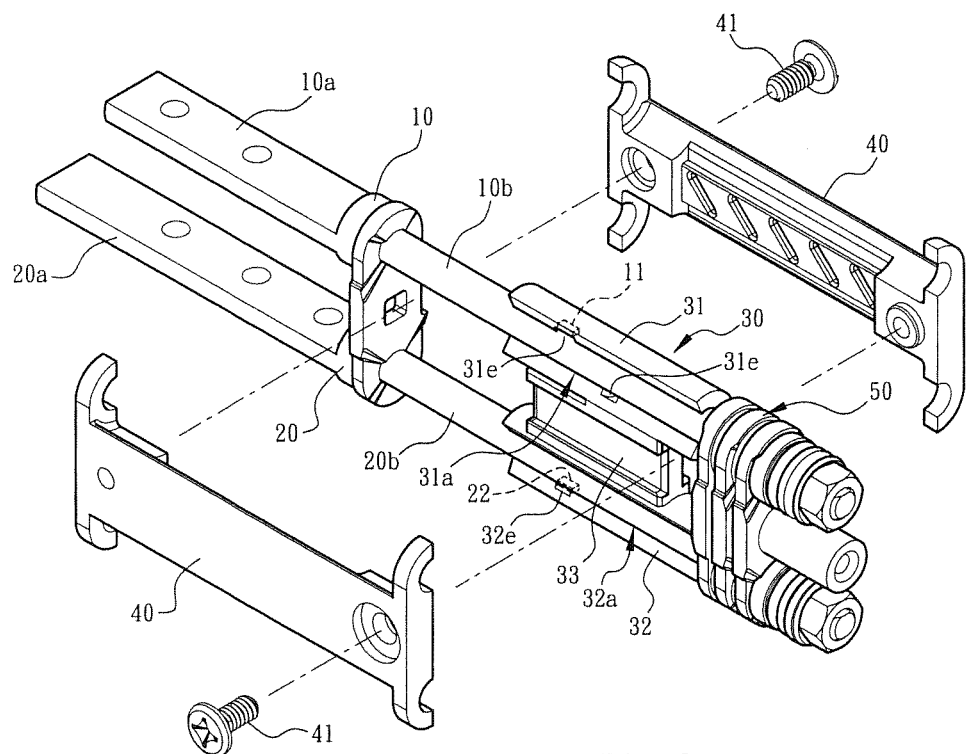
FIG. 2 is a perspective view of the synchronous movement device of the present invention.
Figure 3:
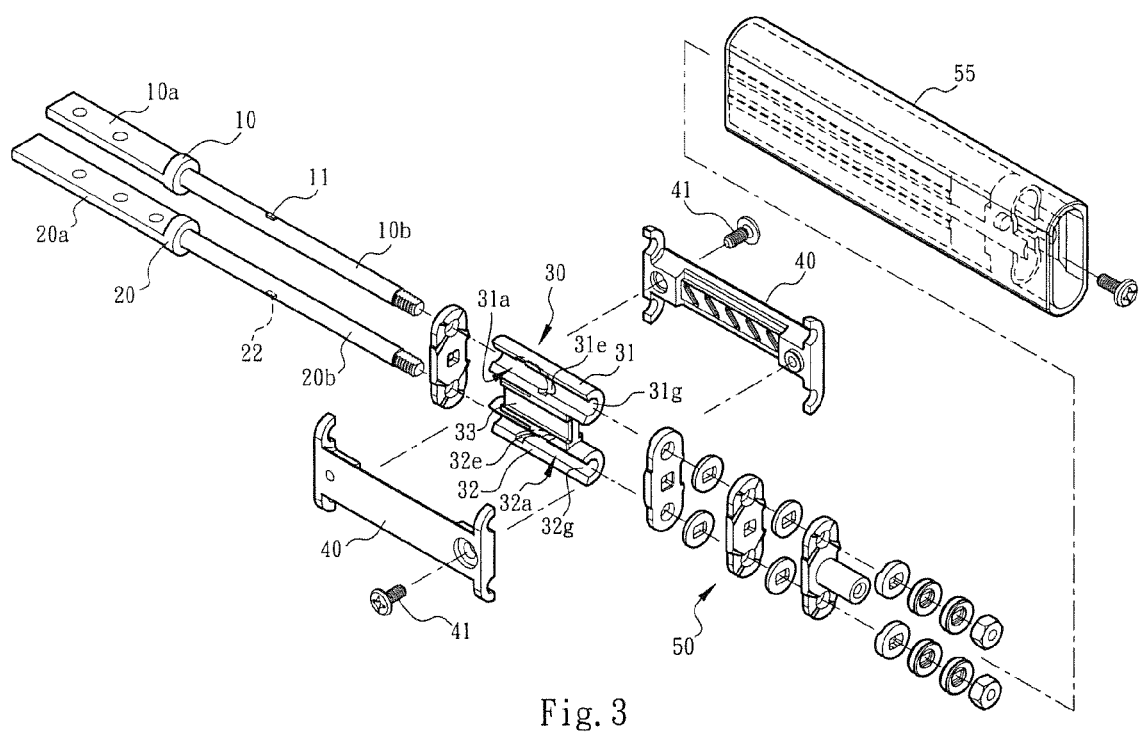
FIG. 3 is a perspective exploded view of the synchronous movement device of the present invention, showing the positional relationship between the first and second shafts, the driver, the link unit and the reactor.
Figure 4:
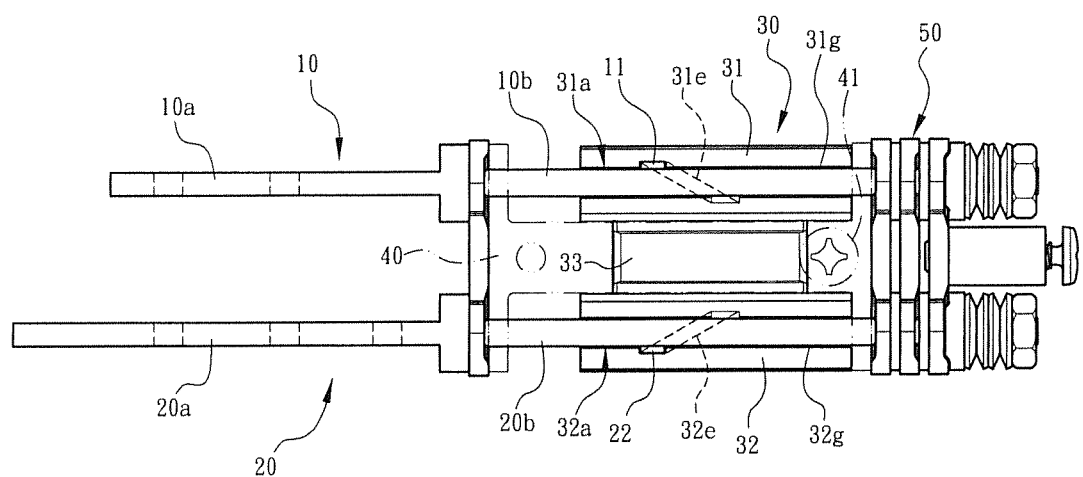
FIG. 4 is a plane view of the synchronous movement device of the present invention, showing that the display module is closed on the apparatus body module and the angle contained between the display module and the apparatus body module is 0°.

Please refer to FIGS. 1, 2 and 3. The synchronous movement device applied to dual-shaft system of the present invention includes a first shaft 10 and a second shaft 20. The first and second shafts 10, 20 are assembled with each other and disposed in a casing 55. Each of the first and second shafts 10, 20 has a fixed end 10a, 20a and a pivoted end 10b, 20b. Through fixing seats (not shown), the fixed ends 10a, 20a of the first and second shafts 10, 20 are respectively fixed on a display module 91 and an apparatus body module 92 of an electronic apparatus 90 (such as a mobile phone or a computer).

Please refer to FIGS. 2 and 3. The pivoted end 10b of the first shaft 10 is provided with a driver 11 rotatable with the first shaft 10. The pivoted end 20b of the second shaft 20 is provided with a reactor 22 synchronously rotatable with the second shaft 20. In addition, the pivoted ends 10b, 20b of the first and second shafts 10, 20 are provided with a link unit 30 connected with the driver 11 and the reactor 22. The driver 11, reactor 22 and the link unit 30 are assembled on the first and second shafts 10, 20 via a fixing assembly 50. When the first shaft 10 drives the driver 11 to rotate, the link unit 30 is pushed and displaced to forcedly rotate the reactor 22 in a direction reverse to the moving direction of the driver 11, whereby the first and second shafts 10, 20 are synchronously rotated.

In this embodiment, the link unit 30 includes a first main body 31 and a second main body 32 assembled on the pivoted ends 10b, 20b of the first and second shafts 10, 20 respectively. The first and second main bodies 31, 32 have the form of a geometrical case and are integrally formed or connected with each other and (axially) movable along the first and second shafts 10, 20.

To speak more specifically, the first and second main bodies 31, 32 have the form of a case larger than semicircle. Each of the first and second main bodies 31, 32 is formed with a cavity 31g, 32g in the axial direction. The (inner) circumference of the cavity 31g, 32g ranges from 180 degrees to 360 degrees. (That is, the circumferences of the cavities 31g, 32g of the first and second main bodies 31, 32 are within a range from 180 degrees to 360 degrees). In addition, each of the first and second main bodies 31, 32 is formed with a split 31a, 32a in the axial direction in parallel to the cavity 31g, 32g. The angle of the split 31a, 32a is smaller than 180 degrees, and preferably ranges from 100 degrees to 145 degrees. Accordingly, the first and second main bodies 31, 32 (or the cavities 31g, 32g) at least enclose the pivoted ends 10b, 20b, whereby the first and second shafts 10, 20 can rotate within the cavities 31g, 32g without detaching from the first and second main bodies 31, 32.

In this embodiment, the link unit 30 has a connection section 33 integrally connected between the first and second main bodies 31, 32.

The driver 11 and the reactor 22 have the form of a raised section. The driver 11 and the reactor 22 are respectively disposed on the pivoted ends 10b, 20b of the first and second shafts 10, 20. The inner walls of the cavities 31g, 32g of the first and second main bodies 31, 32 are at least partially formed with (spiral) guide grooves 31e, 32e corresponding to the driver 11 and the reactor 22 in the form of a raised section. The driver 11 and the reactor 22 are relatively movably received in the guide grooves 31e, 32e.

When the first shaft 10 drives the driver 11 to rotate, the driver 11 received in the guide groove 31e of the first main body pushes the link unit 30 to move along the first and second shafts 10, 20. At the same time, the inner wall of the guide groove 32e of the second main body 32 pushes the reactor 22 to rotate in a direction reverse to the rotational direction of the driver 11. Accordingly, the second shaft 20 is synchronously rotated in a direction reverse to the rotational direction of the first shaft 10.

In this embodiment, the guide groove 31e of the first main body 31 has a spiral direction reverse to the spiral direction of the guide groove 32e of the second main body 32.

It should be noted that the first and second main bodies 31, 32 are respectively formed with the splits 31a, 32a to especially help in forming the guide grooves 31e, 32e on the first and second main bodies 31, 32.

In a preferred embodiment, the synchronous movement device of the present invention further includes a frame set 40. By means of fixing members 41, the frame set 40 is integrally locked to enclose and receive the driver 11, the link unit 30 and the reactor 22. In this case, the driver 11, the link unit 30 and the reactor 22 can more stably and truly operate.

Figure 5:
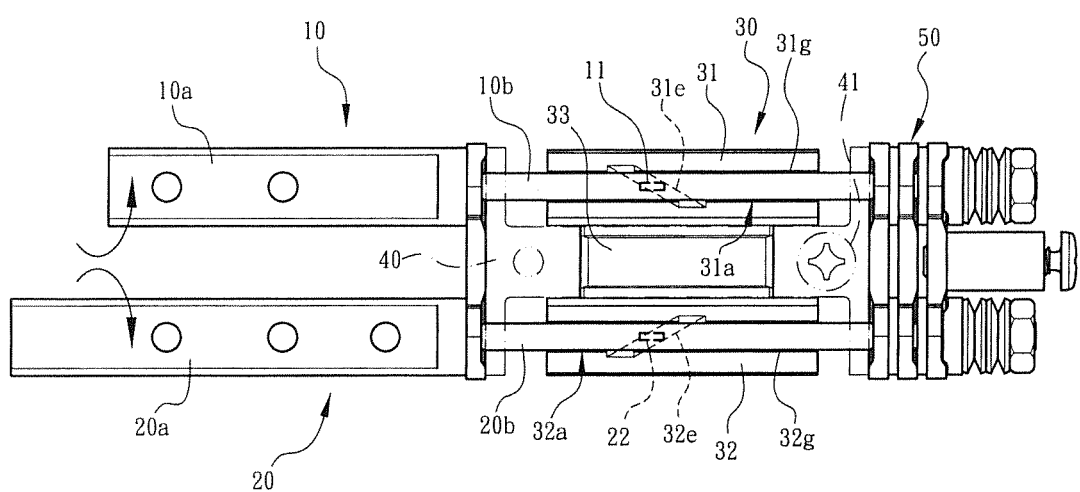
FIG. 5 is a plane view of the synchronous movement device of the present invention, showing that the first shaft and the driver are 90° rotated to synchronously move the link unit, the reactor and the second shaft.

Please refer to FIGS. 1 and 2 or 3 and 4, which show that the display module 91 is closed onto the apparatus body module 92 with the angle contained therebetween 0°. Please refer to FIGS. 4 and 5, when an operator opens the display module 91 to make the first shaft 10 drive the driver 11 to 90° rotate, the driver 11 moves to a middle section of the guide groove 31e of the first main body to push and move the link unit 30 along the first and second shafts 10, 20. FIG. 5 shows that the link unit 30 is moved leftward.

When the link unit 30 is moved, the inner wall of the guide groove 32e of the second main body 32 pushes the reactor 22 to rotate, whereby the second shaft 20 is synchronously rotated in a direction reverse to the rotational direction of the first shaft 10.

Please refer to FIG. 5. When the operator opens the display module 91 to make the first shaft 10 rotate to a 90° position, the driver 11, the link unit 30 and the reactor 22 cooperate with each other to transmit the force and make the second shaft 20 as well as the apparatus body module 92 synchronously clockwise rotate to a 90° position. That is, the display module 91 and the apparatus body module 92 are totally relatively rotated by 180°.

Figure 6:
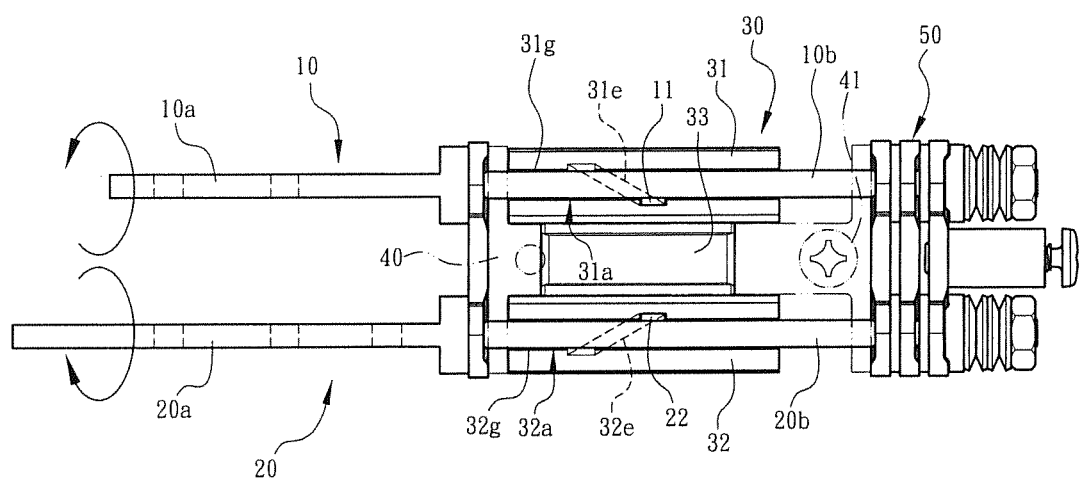
FIG. 6 is a plane view of the synchronous movement device of the present invention, showing that the first shaft and the driver are 180° rotated to synchronously move the link unit, the reactor and the second shaft.

Referring to FIG. 6, when the operator opens and rotates the display module 91 to a 180° position, the apparatus body module 92 is synchronously clockwise rotated to a 180° position. That is, the display module 91 and the apparatus body module 92 are totally relatively rotated by 360°.

That is, by means of the synchronous movement device, a user can operate and rotate the display module 91 by a certain angle or range to achieve a travel double the rotational angle or range. Accordingly, the user can more quickly and conveniently operate the electronic apparatus.

It should be noted that during the force transmission process of the synchronous movement device of the present invention, the driver 11, the link unit 30 and the reactor 22 are cooperatively assembled with each other to minimize the possibility of torque change or slippage that often happens in the conventional device. In this case, the first and second shafts 10, 20 can be smoothly rotated. Moreover, once the rotational force disappears, the rotors stop rotating to be located in a desired position.

In comparison with the conventional device, the synchronous movement device applied to the dual-shaft system of the present invention has the following advantages:

1. The rotary shafts (the first and second shafts 10, 20) are the relevant components (such as the driver 11, the link unit 30 and the reactor 22) together form a synchronous movement mechanism. This structure is apparently different from the conventional device, which employs multiple gears or rollers and drive wires (or transmission belts) for transmitting force and rotating the rotary shafts or multiple gaskets, frictional plates and cooperative springs for storing energy and releasing the energy.

2. The driver 11 and the reactor 22 and the cooperative link unit 30 together form a synchronous movement device. The synchronous movement device is mounted between the display module 91 and the apparatus body module 92. When an operator 0°~180° rotates the display module 91, the apparatus body module 92 will synchronously relatively rotate by 0°~180°. Accordingly, the total rotational angle of the display module 91 and the apparatus body module 92 is 360° That is, by means of the synchronous movement device, a user can operate and rotate the display module 91 by a certain angle or range to achieve a travel double the rotational angle or range. Accordingly, the user can more quickly and conveniently operate the electronic apparatus in more operation modes (or application ranges).

3. The driver 11 and the reactor 22 and the cooperative link unit 30 together form a synchronous transmission structure different from the conventional transmission mechanism and relevant cooperative structures. The synchronous movement device of the present invention overcomes the problem of delay of kinetic energy transmission of the conventional wires or transmission belts. The synchronous movement device of the present invention also solves the problem of the conventional transmission mechanism that there is a gap between the wires and the rollers so that the wires will slip or untruly operate. The synchronous movement device of the present invention also solves the problem of the conventional transmission mechanism that the fixing structure for assembling the wires with the rollers is not ideal so that in force transmission, the load on the wires or the pulling force applied to the wires will increase to deteriorate the transmission effect.

4. The driver 11 and the reactor 22 and the cooperative link unit together form a synchronous transmission structure advantageous over the conventional transmission mechanism in that the synchronous transmission structure is easier to manufacture and assemble. Moreover, the synchronous movement device or transmission mechanism of the present invention is free from any gear for transmitting force as in the conventional technique. Therefore, the gap between the shafts can be as minified as possible. Therefore, the space occupied by the entire transmission unit or structure is reduced. Accordingly, when the transmission unit is applied to an electronic device, the electronic device can meet the requirement for lightweight and slimmed design.

5. Each of the first and second main bodies 31, 32 is formed with a split 31a, 32a. The angle of the split 31a, 32a is smaller than 180 degrees. The first and second shafts 10, 20 are rotated within the cavities 31g, 32g without detaching from the first and second main bodies 31, 32. The splits 31a, 32a especially help in forming the guide grooves 31e, 32e on the first and second main bodies 31, 32. In contrast, with respect to U.S. Pat. No. 7,512,426 B2, it is necessary to drill the entirely closed block to form inner threads in adaptation to the threaded protrusion sections of the first and second shafts. The processing process is complicated and the processing time is prolonged. The present invention is applicable to a sophisticated electronic apparatus such as a mobile phone or the like to solve the above problem. Moreover, the present invention solves the problems of sliding of the block and delay of power transmission. Especially, the present invention improves the problem of U.S. Pat. No. 7,512,426 B2 that a higher cooperation precision is required. Therefore, the present invention has simpler structure and is easy to manufacture and assemble.

6. As aforesaid, it is impossible to combine U.S. Pat. No. 7,512,426 B2 with U.S. Pat. No. 4,200,957. This is because in case of simple combination, the synchronous movement device should have the necessary technical characteristics of the sleeve and the hole formed on the shaft of U.S. Pat. No. 4,200,957 for inserting the pin member and fitting with the roller. However, the necessary technical characteristics obviously cannot be further assembled with the main component of the closed block of U.S. Pat. No. 7,512,426 B2 to make the block relatively move on the socket for transmitting power. That is, in the present invention, each of the first and second main bodies 31, 32 is formed with a split 31a, 32a and a guide groove 31e, 32e for assembling with the first and second shafts 10, 20 and the non-spiral raised sections of the driver 11 and reactor 22 to form a synchronous movement mechanism. The present invention is apparently different from U.S. Pat. No. 4,200,957 in structural characteristic and component connection relationship, which is specifically designed for application to a door or furniture system, (including the sleeve and the single shaft with the hole for inserting the pin member and fitting with the roller). Also, the synchronous movement mechanism of the present invention is especially mountable on a sophisticated electronic apparatus 90 such as a mobile or the like to synchronously 360-degree rotate the display module 91 and the apparatus body module 92. As aforesaid, it is impossible to simply modify the mono-shaft sleeve and assemble with the dual-shaft system of the closed block of U.S. Pat. No. 7,512,426 B2 to directly achieve the structure of the present invention.

In conclusion, the synchronous movement device applied to the dual-shaft system of the present invention is different from and advantageous over the conventional device.

The above embodiments are only used to illustrate the present invention, not intended to limit the scope thereof. Many modifications of the above embodiments can be made without departing from the spirit of the present invention.

What is claimed is:

1. A synchronous movement device applied to dual-shaft system, comprising: a first shaft having a fixed end and a pivoted end; a driver disposed at the pivoted end of the first shaft; a second shaft having a fixed end and a pivoted end; a reactor disposed at the pivoted end of the second shaft; and a link unit having a first main body and a second main body connected with each other, the first and second main bodies being assembled and disposed on the first and second shafts, the first and second main bodies respectively having the form of a geometrical case, each of the first and second main bodies being formed with a cavity for receiving the pivoted ends of the first and second shafts, each of the cavities of the first and second main bodies having a circumference ranging from 180 degrees to 360 degrees, each of the first and second main bodies being formed with a split in the axial direction in parallel to the cavity, the split having an angle smaller than 180 degrees, the first and second main bodies being respectively connected with the driver and the reactor, the driver being rotatable with the first shaft to push the link unit to move along the first and second shafts so as to make the reactor rotate in a direction reverse to a moving direction of the driver, whereby the first and second shafts are synchronously rotated.

2. The synchronous movement device applied to dual-shaft system as claimed in claim 1, wherein the link unit has a connection section connected between the first and second main bodies.

3. The synchronous movement device applied to dual-shaft system as claimed in claim 2, wherein the first and second main bodies and the connection section are integrally formed.

4. The synchronous movement device applied to dual-shaft system as claimed in claim 1, wherein the angles of the splits of the first and second main bodies range from 100 degrees to 145 degrees.

5. The synchronous movement device applied to dual-shaft system as claimed in claim 1, further comprising a frame set, by means of fixing members, the frame set being integrally locked to enclose and receive the driver, the link unit and the reactor.

6. The synchronous movement device applied to dual-shaft system as claimed in claim 1, wherein the fixed ends of the first and second shafts are respectively fixed on a display module and an apparatus body module of an electronic apparatus by means of fixing seats.

7. The synchronous movement device applied to dual-shaft system as claimed in claim 1, wherein when the first shaft is 0°~180° rotate, the second shaft is synchronously 0°~180° rotated in a reverse direction.

8. The synchronous movement device applied to dual-shaft system as claimed in claim 6, wherein when the first shaft is 0°~180° rotate, the second shaft is synchronously 0°~180° rotated in a reverse direction.

9. The synchronous movement device applied to dual-shaft system as claimed in claim 1, wherein the driver and the reactor have the form of a raised section, the first and second main bodies being respectively formed with guide grooves corresponding to the driver and the reactor in the form of a raised section for movably receiving the driver and the reactor.

10. The synchronous movement device applied to dual-shaft system as claimed in claim 4, wherein inner walls of the cavities of the first and second main bodies are at least partially formed with guide grooves.

11. The synchronous movement device applied to dual-shaft system as claimed in claim 10, wherein the guide grooves are spiral guide grooves.

12. The synchronous movement device applied to dual-shaft system as claimed in claim 9, wherein the guide groove of the first main body has a spiral direction reverse to a spiral direction of the guide groove of the second main body.

13. The synchronous movement device applied to dual-shaft system as claimed in claim 10, wherein the guide groove of the first main body has a spiral direction reverse to a spiral direction of the guide groove of the second main body.

14. The synchronous movement device applied to dual-shaft system as claimed in claim 11, wherein the guide groove of the first main body has a spiral direction reverse to a spiral direction of the guide groove of the second main body.

* * * * *